（12) United States Patent
Branyon

(10) Patent No.: US 10,442,589 B2
(45) Date of Patent: Oct. 15, 2019

(54) INTEGRATED ONE-WAY VALVE WITH POLYOL FILM

(71) Applicant: Sonoco Development, Inc., Hartsville, SC (US)

(72) Inventor: Jacob Donald Prue Branyon, Hartsville, SC (US)

(73) Assignee: Sonoco Development, Inc., Hartsville, SC (US)

( * ) Notice: Subject to any disclaimer, the term of this patent is extended or adjusted under 35 U.S.C. 154(b) by 399 days.

(21) Appl. No.: 15/465,851

(22) Filed: Mar. 22, 2017

(65) Prior Publication Data

US 2017/0283136 A1 Oct. 5, 2017

Related U.S. Application Data

(60) Provisional application No. 62/318,440, filed on Apr. 5, 2016.

(51) Int. Cl.
*B65D 51/16* (2006.01)
*B65D 77/22* (2006.01)
(Continued)

(52) U.S. Cl.
CPC .............. *B65D 51/16* (2013.01); *B32B 3/266* (2013.01); *B32B 7/04* (2013.01); *B32B 7/14* (2013.01); *B32B 27/08* (2013.01); *B32B 27/24* (2013.01); *B32B 27/285* (2013.01); *B32B 27/304* (2013.01); *B32B 27/306* (2013.01); *B32B 27/32* (2013.01); *B32B 27/34* (2013.01); *B32B 27/36* (2013.01); *B32B 27/365* (2013.01);
(Continued)

(58) Field of Classification Search
CPC ............ B32B 2250/02; B32B 2250/24; B32B 2255/10; B32B 2255/24; B32B 2255/26; B32B 2435/02; B32B 2439/40; B32B 2439/70; B32B 2553/00; B32B 2581/00; B32B 27/08; B32B 27/24; B32B 27/285; B32B 27/304; B32B 27/306; B32B 27/32; B32B 27/34; B32B 27/36; B32B 27/365; B32B 37/1292; B32B 3/266; B32B 7/04; B32B 7/14; B65D 2251/0018; B65D 2251/0093; B65D 33/01; B65D 43/02; B65D 51/16; B65D 51/1644; B65D 51/20; B65D 77/225

See application file for complete search history.

(56) References Cited

U.S. PATENT DOCUMENTS 4,206,870 A 6/1980 DeVries
7,169,419 B2 1/2007 Dalton et al.
(Continued)

*Primary Examiner* — Yan Lan
(74) *Attorney, Agent, or Firm* — Miller, Matthias & Hull LLP

(57) ABSTRACT

A one-way valve integrated into a lamination of the kind used as a membrane seal for coffee containers and the like. The valve comprises a top layer, a substrate and a fluid polyol film. The top layer and the substrate are adhered together by an adhesive disposed between the top layer and the substrate. The adhesive defines a boundary of a valve chamber in which the top layer and the substrate are not permanently adhered to each other. The film enhances the adhesiveness of the top layer to the substrate in the area of the valve chamber so that gas inside the container does not escape until the internal pressure reaches a minimum value.

16 Claims, 4 Drawing Sheets

(51) Int. Cl.
  B65D 43/02    (2006.01)
  B65D 33/01    (2006.01)
  B32B 7/04     (2019.01)
  B32B 7/14     (2006.01)
  B32B 27/08    (2006.01)
  B32B 27/24    (2006.01)
  B32B 27/28    (2006.01)
  B32B 27/30    (2006.01)
  B32B 27/32    (2006.01)
  B32B 27/34    (2006.01)
  B32B 27/36    (2006.01)
  B32B 3/26     (2006.01)
  B65D 51/20    (2006.01)
  B32B 37/12    (2006.01)

(52) U.S. Cl.
  CPC .............. *B65D 33/01* (2013.01); *B65D 43/02* (2013.01); *B65D 51/1644* (2013.01); *B65D 51/20* (2013.01); *B65D 77/225* (2013.01); *B32B 37/1292* (2013.01); *B32B 2250/02* (2013.01); *B32B 2250/24* (2013.01); *B32B 2255/10* (2013.01); *B32B 2255/24* (2013.01); *B32B 2255/26* (2013.01); *B32B 2435/02* (2013.01); *B32B 2439/40* (2013.01); *B32B 2439/70* (2013.01); *B32B 2553/00* (2013.01); *B32B 2581/00* (2013.01); *B65D 2251/0018* (2013.01); *B65D 2251/0093* (2013.01)

(56) References Cited

U.S. PATENT DOCUMENTS

| | | |
|---|---|---|
| 7,527,840 B2 | 5/2009 | Zeik |
| 7,596,931 B2 | 10/2009 | Gunter et al. |
| 7,892,390 B2 | 2/2011 | Zeik |
| 2006/0096982 A1* | 5/2006 | Gunter .................. B65B 7/2878 220/89.1 |
| 2008/0260917 A1* | 10/2008 | Sankey .................... B32B 3/10 426/114 |
| 2009/0186174 A1 | 7/2009 | Zeik |
| 2014/0055736 A1 | 2/2014 | Ishak |
| 2015/0102030 A1 | 4/2015 | Gardner et al. |
| 2015/0298442 A1 | 10/2015 | Morin |

\* cited by examiner

INTEGRATED ONE-WAY VALVE WITH POLYOL FILM

BACKGROUND OF THE INVENTION

Field of the Invention

This disclosure relates to packaging for products that tend to release gasses after filling and sealing. More particularly, this disclosure relates to flexible one-way gas release valve integrated into a lamination and forming part of a peelable seal or a packaging wall.

Description of the Related Art

One-way valves integrated into a lamination are known. The lamination typically comprises a top layer and a bottom layer adhered together by an adhesive, except in the valve chamber. Usually such valves require a film or lubricant in the valve chamber to increase adhesion between the laminate layers, thereby preventing gas from entering or exiting the container until the container interior reaches a minimum pressure. When that minimum pressure is reached, the pressure from the interior overcomes the adhesiveness of the laminate layers, allowing gas to escape from the container. Zeik U.S. Pat. No. 7,527,840 discloses a one-way valve in which particles are suspended in a film to reduce the adhesiveness of the film at the laminate interface. The film itself may be silicon oil, hydrocarbon oil or water.

The adhesive that adheres the top layer of the valve to the peelable seal or to the packaging wall and the film in the valve chamber that provides adhesion between the valve layers may be laid down via printing. Unfortunately, silicon oil and glycerin, another commonly used film component, can cause contamination of the lamination and the printing press.

Thus there is a need for a film that provides the necessary adhesion properties of a typical one-way valve film, but that can be printed without contaminating the lamination or the printer. The film should also be acceptable for use with food packaging and, if possible, as a component acceptable for food contact. The present disclosure is designed to address these needs.

BRIEF SUMMARY OF THE INVENTION

The present disclosure relates to a novel one-way valve integrated into a lamination of the kind used as a membrane seal for coffee containers and the like. In one embodiment that valve comprises a top layer, a substrate and a fluid film. The top layer and the substrate are adhered together by an adhesive disposed between the top layer and the substrate. The adhesive defines a boundary of a valve chamber in which the top layer and the substrate are not permanently adhered to each other. The film occupies some or all of the valve chamber between the top layer and the substrate. The substrate defines one or more inlet openings through which a gas may travel through the substrate into the valve chamber. The top layer defines one or more outlet openings through which the gas may travel from the valve chamber to the outside. The valve is moveable between an open position in which gas can escape to the outside and a closed position in which gas cannot escape to the outside.

The film comprises a polyol and occupies enough of the valve chamber to prevent external air from entering the container when the valve is in the closed position. The film enhances the adhesiveness of the top layer to the substrate in the valve chamber region so that gas inside the container does not escape until the internal pressure reaches a minimum value.

DETAILED DESCRIPTION OF THE INVENTION

Figure 1:
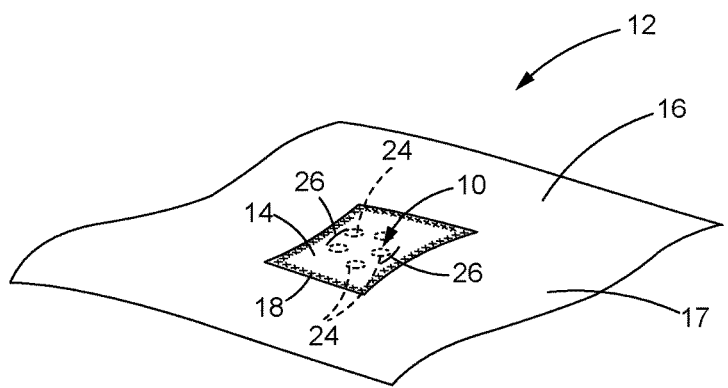
FIG. 1 is a perspective view of a one-way valve integrated into a laminate 12.

While the invention described herein may be embodied in many forms, there is shown in the drawings and will herein be described in detail one or more embodiments with the understanding that this disclosure is to be considered an exemplification of the principles of the invention and is not intended to limit the disclosure to the illustrated embodiments.

As will be appreciated, terms such as "top" and "bottom" refer in this description to the orientation of the structure of the valve as it is illustrated in the perspective and across sectional views. For example, "top" refers to the direction away from the package interior and "bottom" refers to the direction toward the package interior. Such terms are not intended to limit the invention to a particular orientation. The term "integrally formed" when used to describe the relationship between the one-way valve and the structure to which it is affixed means that at least part of the structure forms a part of the one-way valve Like structures may be given the same element number in different embodiments.

Turning to the drawings, there is shown in FIG. 1 a novel one-way valve 10 integrally formed in a laminate 12 like the kind used for flexible food packaging or as a membrane seal for coffee containers and the like. The laminate 12 comprises a top layer 14 adhered to a top surface 17 of a substrate 16 by an adhesive 18. The substrate 16 defines a first set of openings 24 and the top layer 14 defines a second set of openings 26 through which a gas may travel from inside the package to the outside. More specifically, the substrate 16 defines one or more inlet openings 24 through which a gas may travel from the interior of the package into the valve chamber 20, and the top layer 14 defines one or more outlet openings 26 through which a gas may travel from the valve chamber 20 to the exterior of the package, i.e., the outside.

Figure 2:
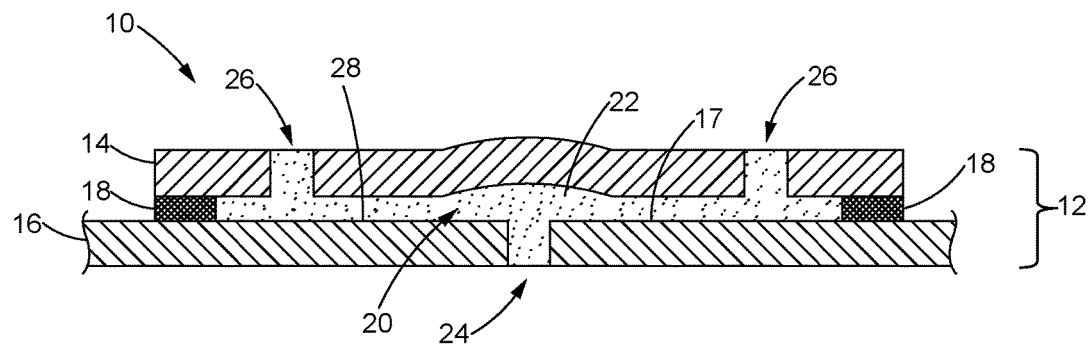
FIG. 2 is a cross-sectional view of the one-way valve of FIG. 1 shown in the closed position.

FIG. 2 shows the valve 10 in the closed position. The top layer 14, the substrate 16 and the adhesive 18 define a valve chamber 20. A fluid film 22, described in more detail below, helps the top layer 14 adhere to the substrate 16 in a region corresponding to the valve chamber 20.

The Substrate 16

Where the container is a flexible package, the package wall may be the substrate 16. Alternatively, the substrate 16 may be a separate layer or layers of material adhered to the outer surface of the package wall. In the latter case, the packaging wall must define one or more openings that communicate with the one or more substrate inlet openings 24 and thus the valve chamber 20.

The substrate 16 may be a single layer of material or multiple layers of material. For example, the substrate 16 may be multiple layers of material laminated together to form a peelable membrane seal. The substrate 16 and the top layer 14 each may be formed from an organic polymer sheet material or materials such as polyolefin, polyamides, polyesters, polycarbonates, high density polyethylene (HDPE), polyvinyl chloride (PVC), ethylene vinyl alcohol (EVOH), polyvinyl alcohol (PVOH), polyvinylidene chloride (PVDC), and the like and combinations thereof. In addition to the organic polymer sheet(s), the substrate 16 may include a metallized polymer film such as metallized polyethylene terephthalate laminated on the interior of the substrate 16 and in direct contact with the food product enclosed therein. The top layer 14 may similarly be formed from one or more layers of organic polymer sheets.

The adhesive 18 defines the boundary of the valve chamber 20, the valve chamber 20 being an area in which the top layer 14 and the substrate 16 are not permanently adhered to each other. Instead, the fluid film 22 occupies at least a portion of the valve chamber 20 and adheres the top layer 14 to the substrate 16 within the valve chamber 20 when the pressure differential between the internal pressure of the container 30 and the external ambient air pressure is less than a minimum gas release pressure differential.

The fluid film 22 occupies enough of the valve chamber 20 to prevent external air from entering the container. The fluid film 22 enhances the adhesiveness of the top layer 14 to the substrate 16 in the valve chamber 20 so that gas inside the container does not escape until the internal pressure reaches a minimum value.

The substrate inlet openings 24 and the top layer outlet openings 26 may be scores, perforations or other openings. The substrate inlet openings 24 and the top layer outlet openings 26 preferably are offset, that is, not aligned the direction orthogonal to a plane defined by the laminate 12.

Figure 3:
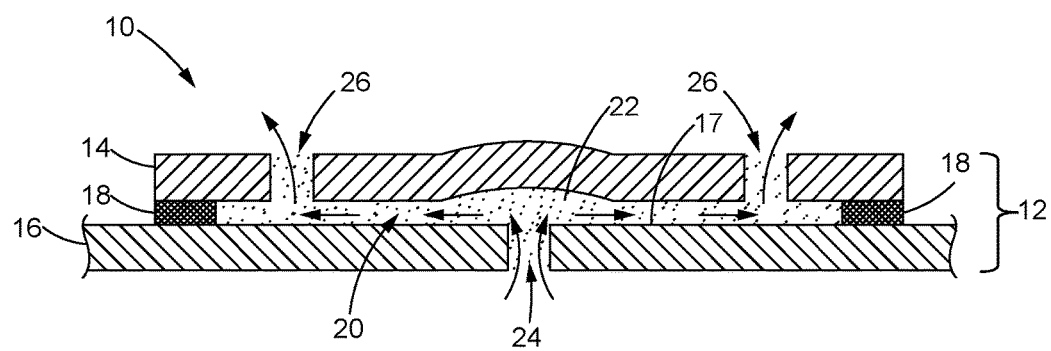
FIG. 3 is a cross-sectional view of the one-way valve of FIG. 1 shown in the open position.

FIG. 3 shows the valve 10 in the open position. In this open valve state, the gas inside the container has achieved an internal pressure sufficient to overcome the adhesiveness of the top layer 14 and the substrate 16 to create one or more pressure relief channels through the fluid film 22, indicated by the unnumbered arrows in the figure.

The Fluid Film 22

In a key aspect of the invention, the fluid film 22 comprises a polyhydric alcohol (a "polyol"), that is, an alcohol comprising multiple hydroxyl (OH) groups. The polyol may be a diol, triol, etc. depending on the number of hydroxyl groups it contains. Diols are also referred to as glycols and often have a sweet taste. The polyol replaces the silicon oil or glycerin used in traditional integrated one-way valves. In one embodiment the polyol is a polyether polyol.

The polyol may be selected for certain desirable properties such as viscosity, ability to wet out on the film surface, and ability to be printed. The polyol film 22 may have characteristics similar to a lubricant in that it does not dry or harden. The polyol film 22 may provide a "slick" feel similar to silicon oil and glycerin. The polyol should not contaminate the laminate 12 should any of the film 22 transfer to an area outside of the intended application (print) area. If the polyol film 22 contacts the permanent laminating adhesive 18, the polyol film 22 may react with the adhesive 18 in that area, but the polyol film 22 will not cause the laminate 12 to degrade (come apart) as oil may. The polyol film 22 provides the necessary adhesion properties for the one way valve 10 and can be printed without contaminating the laminate 12 or the printing machine.

The polyol film 22 can be chosen for its performance attributes with respect to valve functionality. For example, the polyol film 22 can be chosen to achieve the following valve functionalities:

1. A first cycle opening pressure of >0.15 pounds per square inch (psi). This is the internal package pressure at which the valve 10 opens to allow gas to exit the package for the first time.

2. All cycles opening pressure of >0.10 psi. This is the internal package pressure at which the valve 10 opens to allow gas to exit the package for every time after the first time.

3. All cycles—difference between open and dwell pressure is > or =to 0.04 psi. After the valve 10 opens, the internal package pressure stabilizes, that is, decreases and approaches zero, that is, ambient (atmospheric) pressure. Thus, the valve 10 may be designed so that the valve 10 recloses before the internal pressure decreases below 0.04 psi.

4. All cycles closing pressure of > or =0.01 psi. Alternatively, the valve 10 may be designed to close before the internal package pressure decreases below 0.01 psi.

It should be understood that numerical values for the functional pressures provided above and elsewhere in this specification are just examples of a particular valve performance, and that the functional pressures can be other operable pressures.

Method of Applying the Fluid Film 22 and Adhesive 18

The fluid polyol film 22 and the permanent adhesive 18 may be printed onto the top surface 17 of the substrate 16 or reverse printed onto the bottom surface of the top layer 14, so as to be located between the two layers 14, 16 that help define the valve chamber 20. The film 22 and the adhesive 18 can be printed (applied) via rotogravure or flexographic printing and applied as a coating or pattern applied. Pattern applying the adhesive 18 in a pattern that defines the valve chamber boundary allows for a central "deadened" (non-adhesive) area onto which the film 22 may be applied prior to laminating together the top layer 14 and the substrate 16.

INDUSTRIAL APPLICABILITY

Figure 4:
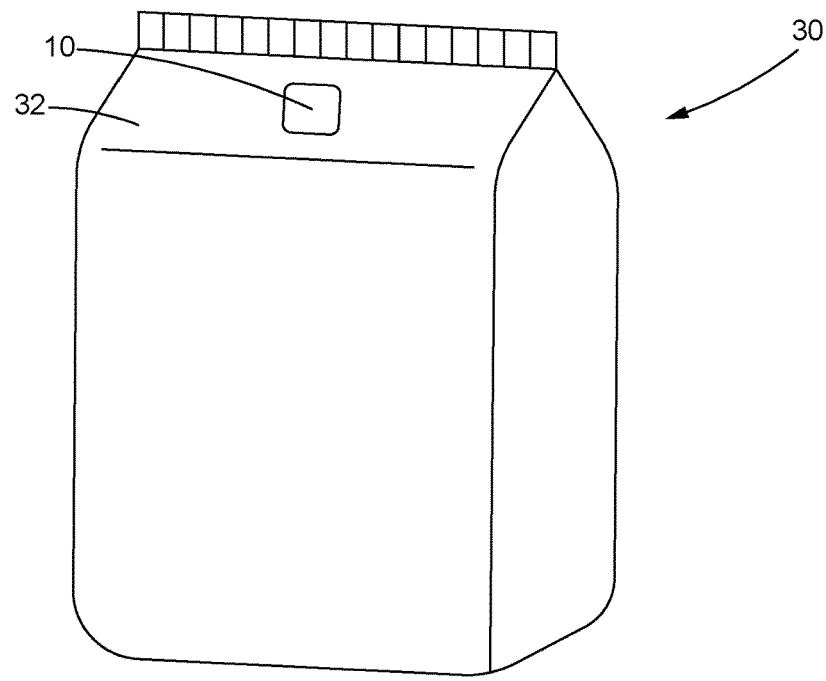
FIG. 4 is a perspective view of a package and integrally formed one-way valve.

The one-way valve 10 may be used with a container in which gas released within the container needs to be released into the atmosphere. For example and without limitation, as shown in FIG. 4 the one-way valve 10 may be used with a flexible package 30 such as that used to hold ground coffee or coffee beans.

Figure 4A:
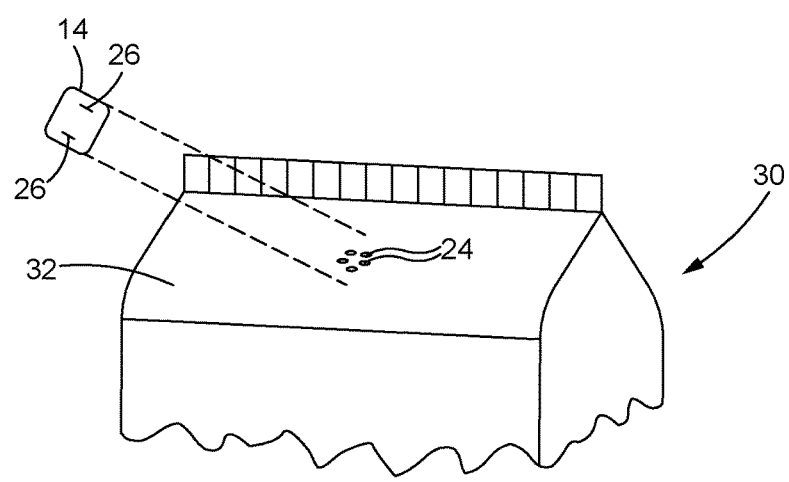
FIG. 4A is a partial view of the package and integrally formed one-way valve of FIG. 4 shown with the valve top layer removed for clarity

As shown in FIG. 4A the valve substrate may be the package wall 32 and the valve top layer 14 may be adhered directly to the package wall 32. In such an embodiment the package wall 32 may be considered a part of the integrated one-way valve 10. The package wall 32 defines inlet openings 24 for allowing gas inside the package 30 to pass into the valve chamber 20.

Figure 5:
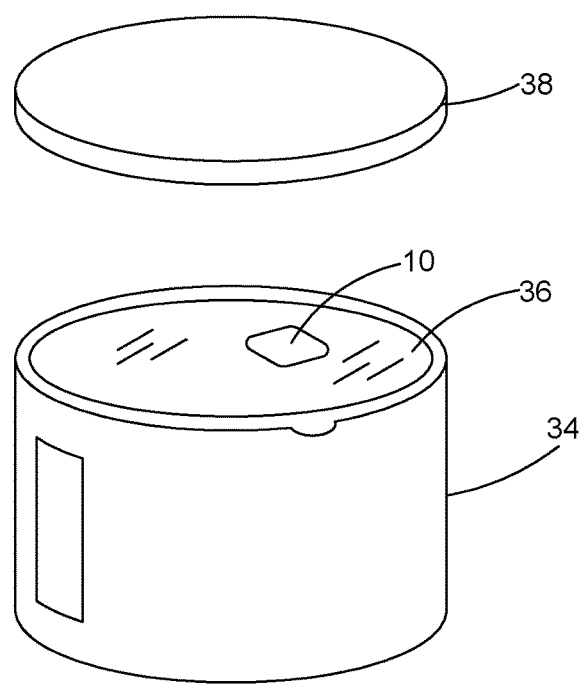
FIG. 5 is a perspective view of a rigid plastic container having a peelable membrane seal and a one-way valve integrally formed into the peelable membrane seal.
Figure 5A:
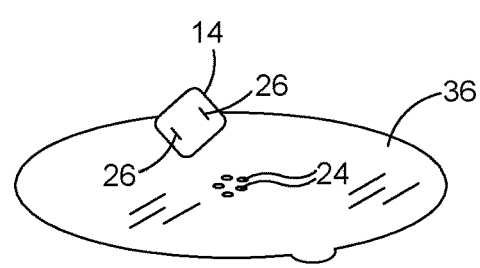
FIG. 5A is a perspective view of the peelable membrane seal and one-way valve of FIG. 5 shown with the valve top layer removed for clarity.

As shown in FIGS. 5 and 5A the one-way valve 10 may be used with a rigid plastic container 34 such as that used to hold ground coffee and having a removable flexible seal 36 that covers the top opening and functions as a valve substrate. A plastic overcap 38 covers the flexible seal 36. The flexible seal 36 defines the valve inlet openings 24. The valve top layer 14 may be adhered to the flexible seal 36 so that it covers the inlet openings 24.

Figure 6:
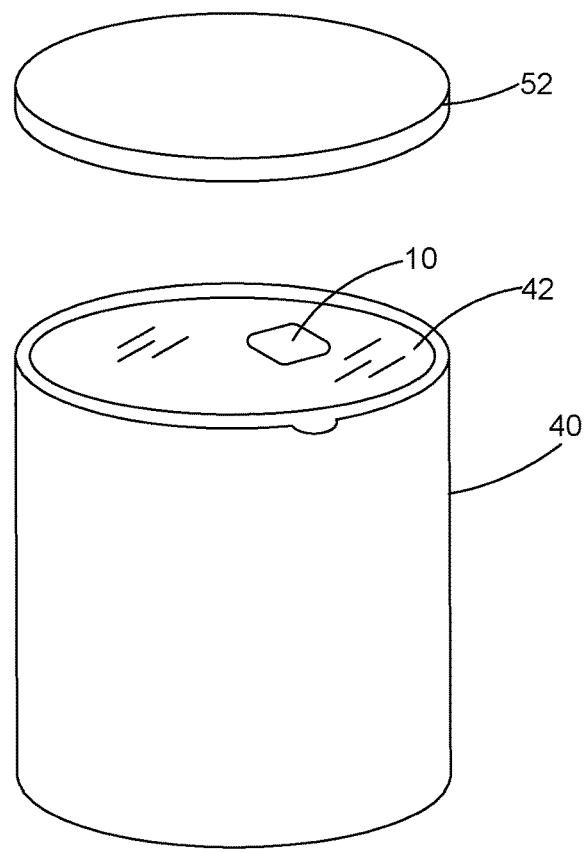
FIG. 6 is a perspective view of a cylindrical metal container having a peelable membrane seal and a one-way valve integrally formed into the peelable membrane seal.
Figure 6A:
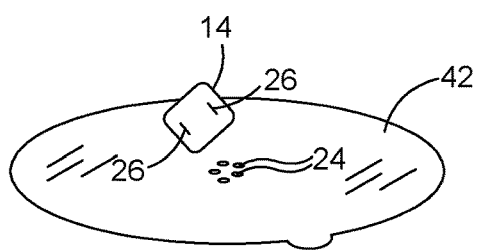
FIG. 6A is a perspective view of the peelable membrane seal and one-way valve of FIG. 6 shown with the valve top layer removed for clarity.

FIGS. 6 and 6A show another application of the one way valve 10 of the disclosure. The one-way valve 10 may be used with a rigid cylindrical metal or plastic container 40 such as that used to hold ground coffee or roasted coffee beans and the valve substrate is a flexible peelable seal 42 adhered to the rim of the container 40 and covered by a plastic overcap 52. The valve top layer 14 is adhered to the flexible seal 42 so that it covers the inlet openings 24.

It is understood that the embodiments of the invention described above are only particular examples which serve to illustrate the principles of the invention. Modifications and alternative embodiments of the invention are contemplated which do not depart from the scope of the invention as defined by the foregoing teachings and appended claims. It is intended that the claims cover all such modifications and alternative embodiments that fall within their scope.

The invention claimed is:

1. A one-way valve for use with a container, the valve comprising:
   a laminate comprising a substrate and a top layer, the substrate defining one or more inlet openings, the top layer defining one or more outlet openings;
   an adhesive disposed between the top layer and the substrate and adhering the top layer to the substrate, the adhesive defining a boundary of a valve chamber in which the top layer and the substrate are not permanently adhered to each other, wherein the one or more inlet openings fluidly connect an interior of the container to the valve chamber and the one or more outlet openings fluidly connect the valve chamber to an exterior surrounding the container; and
   a fluid film occupying at least a portion of the valve chamber and adhering the top layer to the substrate within the valve chamber when a pressure differential between an internal pressure of the container and an ambient air pressure is less than a minimum gas release pressure differential; wherein
   the fluid film does not comprise a silicon oil or glycerin.

2. The one-way valve of claim 1 wherein the fluid film comprises a polyol.

3. The one-way valve of claim 2 wherein the polyol comprises two or three hydroxyl groups.

4. The one-way valve of claim 2 wherein the polyol is a polyether polyol.

5. The one-way valve of claim 2 wherein the polyol does not degrade the laminate.

6. The one-way valve of claim 2 wherein the valve has a first cycle opening pressure of >0.15 psi.

7. The one-way valve of claim 6 wherein the valve has an all cycles opening pressure of >0.10 psi.

8. The one-way valve of claim 2 wherein the valve recloses before the internal pressure decreases below 0.04 psi.

9. The one-way valve of claim 2 wherein the valve recloses before the internal pressure decreases below 0.01 psi.

10. The one-way valve of claim 2 wherein:
    the substrate and the top layer are each formed from organic polymer sheet material.

11. The one-way valve of claim 10 wherein:
    the organic polymer sheet material is selected from the group consisting of polyolefin, polyamides, polyesters, polycarbonates, high density polyethylene (HDPE), polyvinyl chloride (PVC), ethylene vinyl alcohol (EVOH), polyvinyl alcohol (PVOH) and polyvinylidene chloride (PVDC).

12. The one-way valve of claim 2 wherein:
    the container is a flexible package, and the package wall is the substrate.

13. The one-way valve of claim 2 wherein:
    the substrate is a layer or layers of material adhered to an outer surface of the container.

14. The one-way valve of claim 2 wherein:
    the container is a rigid plastic container having a removable flexible seal that covers a top opening and defines the valve inlet openings; and
    the valve top layer is adhered to the flexible seal so that it covers the inlet openings.

15. The one-way valve of claim 2 wherein:
    the fluid film and the adhesive are printed onto a top surface of the substrate.

16. The one-way valve of claim 2 wherein:
    the fluid film and the adhesive are printed onto a bottom surface of the top layer.

* * * * *